May 6, 1958

L. B. GREEN 2,833,349

SHEAR

Filed Jan. 26, 1955

INVENTOR.
LEE B. GREEN
BY Hudson, Boughton,
Williams, David & Hoffmann
ATTORNEYS May 6, 1958 L. B. GREEN 2,833,349
SHEAR
Filed Jan. 26, 1955 5 Sheets-Sheet 2

INVENTOR.
LEE B. GREEN
BY Hudson, Boughton,
Williams, David & Hoffmann
ATTORNEYS May 6, 1958     L. B. GREEN     2,833,349
SHEAR Filed Jan. 26, 1955     5 Sheets-Sheet 3

INVENTOR.
LEE B. GREEN
BY Hudson, Boughton,
Williams, David & Hoffman
ATTORNEYS

May 6, 1958 L. B. GREEN 2,833,349
SHEAR
Filed Jan. 26, 1955 5 Sheets-Sheet 4
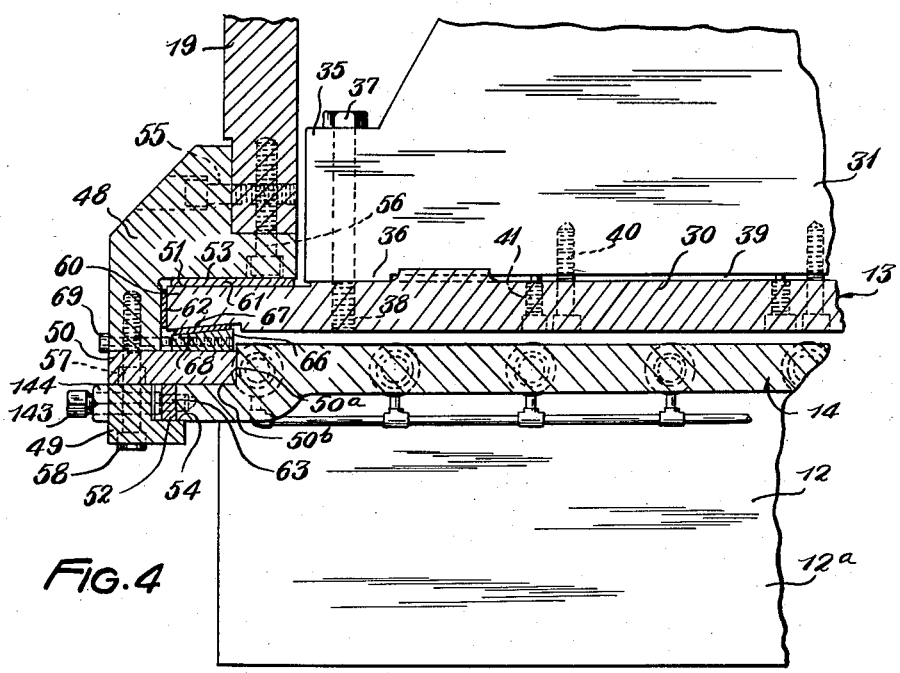
FIG. 4
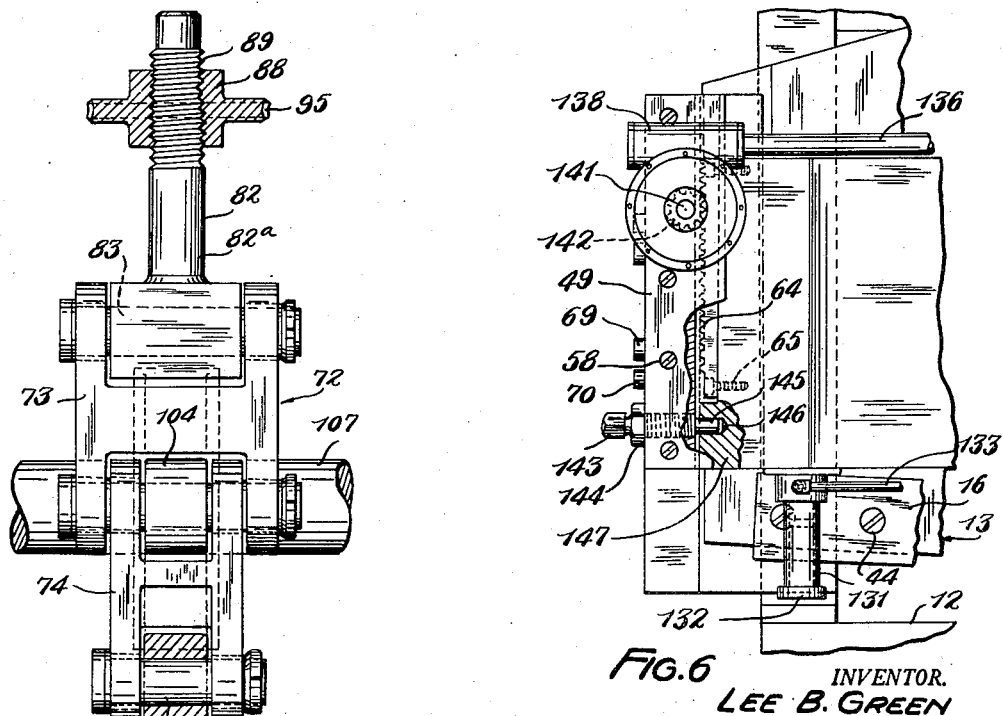
FIG. 5
FIG. 6
INVENTOR.
LEE B. GREEN
BY Hudson Boughton,
Williams, David & Hoffmann
ATTORNEYS May 6, 1958 L. B. GREEN 2,833,349
SHEAR
Filed Jan. 26, 1955 5 Sheets-Sheet 5

INVENTOR.
LEE B. GREEN
BY Hudson, Boughton,
Williams, David & Hoffmann
ATTORNEYS

United States Patent Office 2,833,349
Patented May 6, 1958

2,833,349

SHEAR

Lee B. Green, South Daytona, Fla.

Application January 26, 1955, Serial No. 484,247

4 Claims. (Cl. 164—47)

This invention relates to metal cutting machines of the kind commonly referred to as a shear or shear press and, as one of its objects, aims to provide a shear which is of a relatively simple construction for the economical manufacture thereof, and which can be readily adjusted and serviced for different work requirements and for maintaining the shear in an efficient and accurate working condition.

Another object is to provide a shear in which a movable slide carrying a shear blade is actuated by toggle mechanism.

A further object is to provide a shear having a toggle-actuated slide carrying a shear blade, and in which the toggle means is preferably connected with the slide on the rear side thereof and comprises a pair of toggle devices and a means for simultaneously adjusting the same.

Still another object is to provide a shear comprising a work slide carrying a detachably mounted shear blade, and a work hold-down means operable in front of the work slide and having an extent of movement sufficient to render the blade mounting means readily accessible for removal or adjustment of the blade.

As another object, the invention provides a shear having cooperating shear blades of which the movable blade has a shearing edge relatively tapered longitudinally of the blades, such that a shearing point travels along the blades during relative closing movement therebetween with the major portion of the shearing load concentrated at such shearing point, and in which the actuating means for the movable shear blade includes drive shaft means having a flywheel thereon for delivering stored energy to the blade actuating means during such longitudinal travel of the shearing point.

This invention also provides a shear of the character mentioned above in which novel take-up means is associated with the guideway for the work slide, and in which the hold-down means comprises an auxiliary slide operable in a second guideway by cooperating gear members housed in such second guideway.

Yet another object is to provide a shear in which the work slide is actuated by toggle means in response to pushing and pulling forces applied to a pivotal connection of the toggle means along a path extending in a direction transverse to the guideway of the work slide, such that a desired wedging component of the actuating force is effective on the work slide and movable shear blade.

The invention can be further briefly summarized as consisting in certain novel combinations and arrangements of parts hereinafter described and particularly set out in the claims hereof.

In the accompanying sheets of drawings, forming a part of this specification;

Fig. 4 is a partial horizontal section taken through cooperating frame and slide members substantially as indicated by section line 4—4 of Fig. 1;

Fig. 5 is a fragmentary elevational view showing one of the toggle devices;

Fig. 6 is a fragmentary front elevation corresponding with a portion of Fig. 1 and further illustrating the operation of the slides in their guideways.

Figure 1:
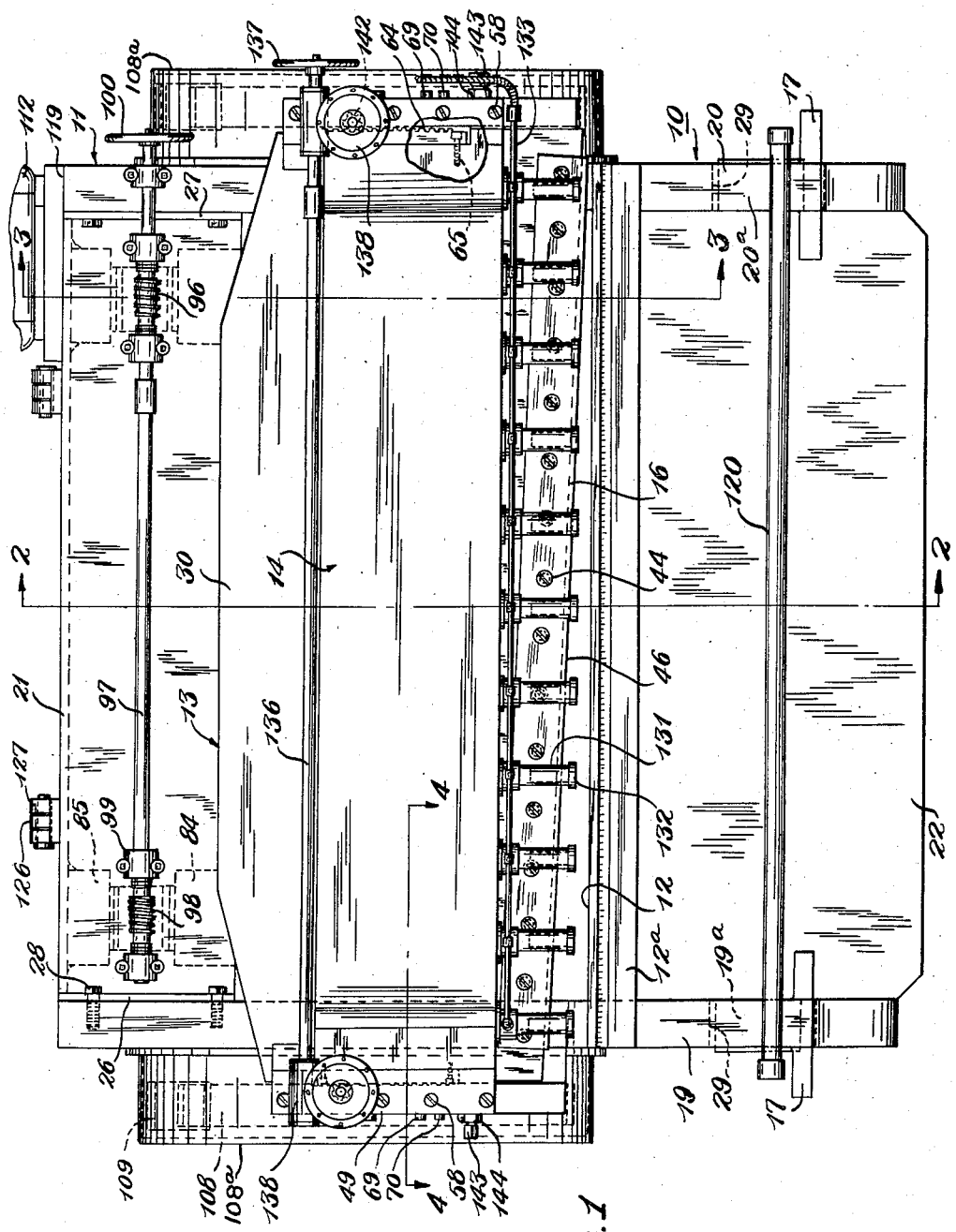
Fig. 1 is a front elevation showing a shear embodying the present invention.

The shear 10 comprises, in general, an upright frame structure 11 having a work support 12 thereon, and a pair of main and auxiliary slides 13 and 14 operable in the frame structure. The shear 10 also comprises a pair of cooperating tool elements or shear blades 15 and 16 which are mounted, respectively, on the work support 12 and the main or work slide 13. The frame structure 11 is provided with suitable support pads or feet 17 by which the shear is adapted to be supported on a suitable base or foundation.

The frame structure 11 comprises a pair of laterally spaced substantially parallel uprights 19 and 20, and laterally extending frame members 21, 22 and 23 extending between and connecting such uprights for maintaining the latter in the substantially parallel relation. The uprights 19 and 20 are provided adjacent the front of the frame with forwardly projecting bracket portions 19$^a$ and 20$^a$ on which a platen or shelf member 12$^a$ is mounted to constitute the work support 12. The uprights 19 and 20 are also provided with laterally aligned recesses adjacent the work support 12 which define a forwardly facing gap 25 into which the workpiece may extend when lying on the work support.

The upper lateral frame member 21 is a hollow connecting member of a box-like cross-sectional shape formed of steel plate and having end flanges 26 and 27 secured against the uprights 19 and 20 by connecting screws 28. The connecting member 22 is a vertically edgewise disposed plate member or slab having its ends connected with the uprights 19 and 20 as by means of end projections 22$^a$ extending into openings 29 of the uprights. The upper edge of the connecting member 22 supports the rear portion of the platen 12$^a$.

The laterally extending frame member 23 is a channel-shaped connecting bar located adjacent the rear of the frame structure and having its ends suitably secured to the uprights 19 and 20.

The main or work slide 13 comprises a plate-like body portion 30 disposed in a vertically edgwise relation, and a horizontal stiffening plate 31 located at the rear of the body plate and mounted thereon. The rear portion of the stiffening plate 31 is connected with the upper portion of the body plate 30 by means of laterally spaced bracket arms 32. The upper ends of these bracket arms are attached to the body plate, as by means of the welds 33, and the lower ends of the bracket arms are connected to the stiffening plate adjacent the rear edge thereof as by means of the welds 34.

The stiffening plate 31 is located at the rear of the lower portion of the body plate 30 and provides a stiffening and aligning means for the body plate, and particularly for the portion of the body plate on which the shear blade 16 is mounted. The stiffening plate 31 is provided with shouldered end portions 35 (see Fig. 4) having relatively short front bearing faces 36, and the body plate 30 is secured against these bearing faces by main clamping screws 37 extending through the shouldered portions 35 and having threaded engagement in openings 38 of the body plate.

Intermediate the bearing portions 36, the front edge of the stiffening plate 31 is spaced from the rear face of the body plate 30 by an intervening narrow space 39. At laterally spaced points between the bearing portions 36, the body plate 30 is secured to the front edge of the stiffening plate 31 by connecting screws 40. The connecting screws 40 extend through the body plate 30 and have threaded engagement in the stiffening plate 31.

An adjusting screw 41 is provided adjacent each connecting screw 40 and has an inner thrust end bearing against the front edge of the stiffening plate 31. The adjusting screws 41 have threaded engagement in openings of the body plate 30, such that by rotation of the latter screws in their threaded openings in a tightening direction, they will wedge the body plate away from the stiffening plate. Likewise, rotation of the connecting screws 40 in a tightening direction, will tend to draw the body plate 30 toward the stiffening plate 31.

Thus, by manipulation of the connecting and adjusting screws 40 and 41, the body plate 30 and the shear blade 16 can be maintained in, or adjusted into, a desired straight condition in which the adjacent faces of the shear blades lie substantially in a common vertical plane for efficient shearing cooperation of the blades during their relative closing movement.

The stationary shearing blade 15 is suitably mounted on the rear edge of the platen 12ª by means of the connecting screws 42. The movable shear blade 16 is mounted on the body plate 30 of the work slide 13 by being seated in a recess 43 provided in the body plate adjacent the lower edge thereof. The shear blade 16 is secured to the body plate 30 by suitable clamping screws 44.

The stationary shearing blade 15 provides a straight shearing edge 45 extending longitudinally of this shear blade and lying substantially in the plane of the work support 12. The movable shear blade 16 has a longitudinally tapered shearing edge 46 which cooperates with the shearing edge 45 during relative closing movement between the blades. By reason of the longitudinal taper of the shearing edge 46, the shearing action on the workpiece will be smooth and effective and will take place at a shearing point which will travel along the shear blades in a direction from right to left, as seen in Fig. 1, during the relative closing movement between the blades. Such a progressive movement of the shearing point along the blades is desirable because it concentrates the force of the shearing effort on a relatively small area of the workpiece at any particular instant of the shearing operation.

The uprights 19 and 20 are each provided with rear and front vertical guide bearing members 48 and 49, and an intermediate vertical guide bearing member 50. These guide members are located on the uprights immediately above the gap 25 and define rear and front guide channels 51 and 52. The laterally spaced channels 51 of the rear guide members 48 define a guideway 53 in which the main slide 13 is operable. The laterally spaced guide channels 52 of the front guide member 49 define a guideway 54 in which the auxiliary slide 14 operates. The auxiliary slide 14 is also guided by cooperating guide surfaces 50ª and 50ᵇ. The guide surfaces 50ª are formed on the auxiliary slide as laterally outwardly facing flat vertical shoulders and the guide surfaces 50ᵇ are formed by the flat vertical inner edges of the intermediate guide members 50.

The rear guide members 48 are secured to the uprights 19 and 20 by groups of connecting screws 55 and 56, and the intermediate guide members 50 are secured to the rear guide members 48 by suitable screws 57. The front guide members 49 are secured to the rear guide members 48 by connecting screws 58 which extend through the intermediate guide members 50 into the rear guide members.

The main slide 13 has vertical follower portions 60 (see Fig. 4) at its ends which operate in the guideway 53 in sliding engagement with bearing liners 61 and 62 of the latter. The auxiliary slide 14 is provided with vertical follower portions 63 at the ends thereof which operate in the guideway 54 and which have racks 64 mounted thereon for a purpose to be explained hereinafter. The racks 64 are mounted on the ends of the auxiliary slide 14 as by means of the connecting screws 65. As shown in the drawings, the racks 64 on the ends of the auxiliary slide 14 and the pinions 142 meshing with these racks are housed in the front pair of guideways 54 into which the ends of this auxiliary slide extend.

Looseness or chattering of the main slide 13 in the guideway 53 is prevented by take-up wedges 66 located between the follower portions 60 and the intermediate guide members 50. The follower portions 60 are provided on the front thereof with tapered bearing surfaces 67 which slidably engage bearing liners 68 carried by the take-up wedges 66. The wedges 66 are adapted to be tightened in the guideway 53 by means of adjusting screws 69 which extend through the guide members 48 and have threaded engagement in the wedges for applying a pulling force thereto. The wedges 66 are secured in their adjusted position by locking screws 70 which extend through, and have threaded engagement in, the rear guide members 48 with the inner ends of the locking screws in pushing engagement with the wedges. The adjusting and locking screws 69 and 70 are provided in pairs similar to the above-described pairs of screws 40 and 41.

The work slide 13 is actuated by toggle means comprising a pair of laterally spaced toggle devices 71 and 72. Each of these toggle devices comprises a pair of upper and lower toggle members or links 73 and 74, and a pivotal connection 75 or knuckle joint connecting the adjacent ends of the toggle members. The toggle devices 71 and 72 have their lower ends pivotally connected with the work slide 13 and their upper ends connected with the frame structure 11, as by means of the connections described hereinafter. In the form of the toggle means shown in Figs. 2 and 3, the members 73 and 74 are of a somewhat curved or bell crank shape.

Figure 2:
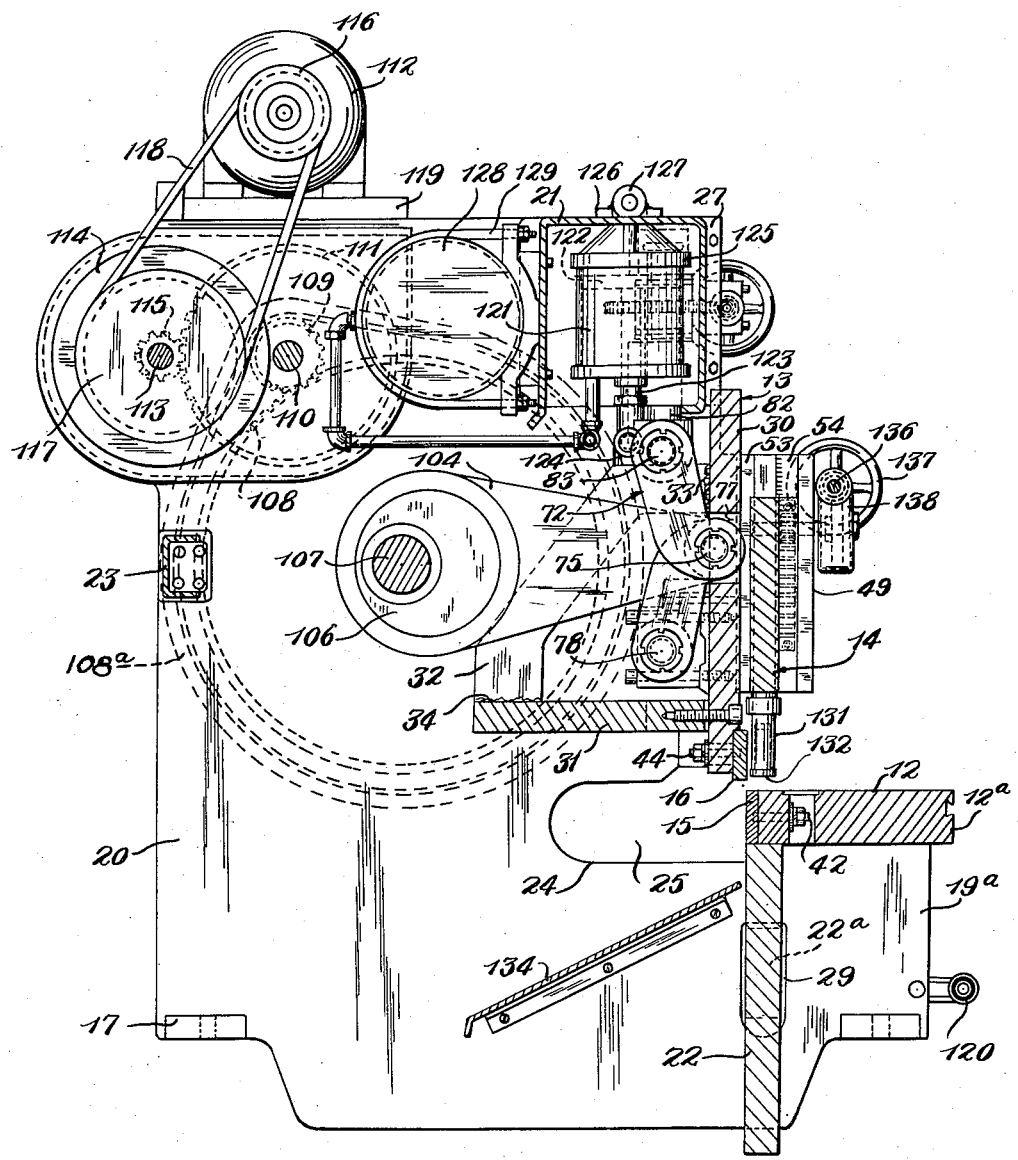
Fig. 2 is a vertical section taken through the shear substantially as indicated by section line 2—2 of Fig. 1.
Figure 3:
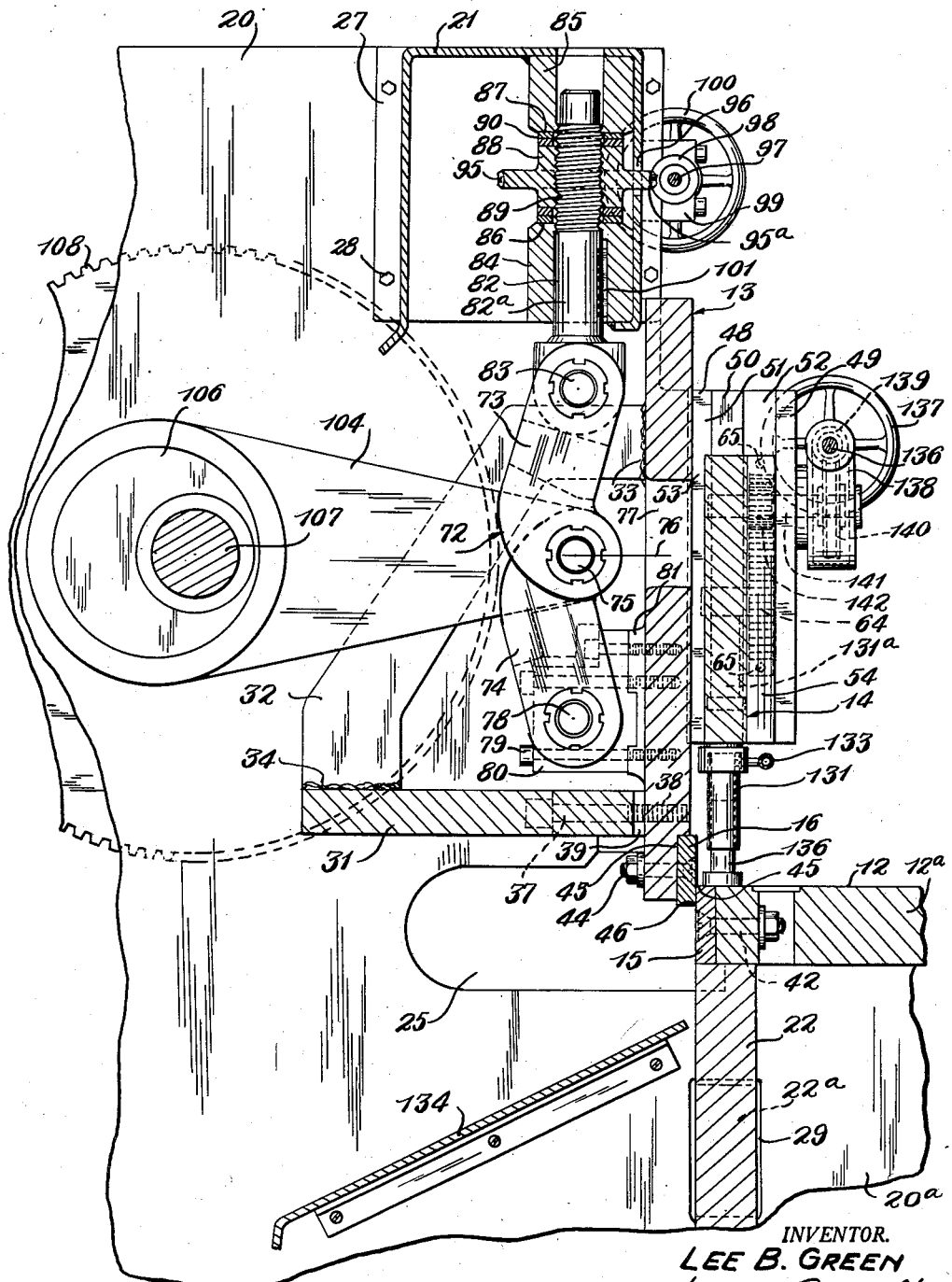
Fig. 3 is a partial vertical section taken through the shear at the location of one of the toggle devices substantially as indicated by section line 3—3 of Fig. 1.

Swinging of the toggle members 73 and 74 from a relatively inclined or contracted condition, shown in Fig. 2, to a substantially straight line or expanded condition, shown in Fig. 3, causes downward movement of the work slide 13 by which the shearing blade 16 is closed relative to the shearing blade 15 to produce the desired shearing operation on the workpiece. Swinging of the toggle members 73 and 74 from the straight line condition of the toggle device, shown in Fig. 3, back to the inclined or collapsed condition, shown in Fig. 2, causes an upward movement of the work slide 13 and a relative opening movement between the shear blades 15 and 16. During this swinging of the toggle devices 71 and 72, the pivotal connections 75 thereof follow a path of movement lying on or adjacent the line 76 which extends substantially normal to the plane of the body plate 30 of the work slide 13 and substantially normal to the common shearing plane in which the shearing edges 45 and 46 of the blades 15 and 16 lie.

The movement of the toggle devices 71 and 72 to the expanded condition of Fig. 3 is preferably produced by a pulling force applied to the pivotal connections 75, such that a component of the actuating force will be effective on the work slide 13 in a direction to wedgingly hold the follower portions 60 of the work slide tightly against the bearing liners 61 of the guideway 53. By thus holding the work slide tightly against the frame bearings, a desired operating clearance of a predetermined width can be maintained between the shear blades. This wedging component of the actuating force also tends to relieve any excessive shearing pressure between the cooperating faces of the shear blades 15 and 16.

As shown in the drawings, the body plate 30 of the work slide 13 is provided with one or more clearance openings 77 into which the pivotal connection 75 of the toggle devices 71 and 72 are movable, during swinging of these devices toward their contracted or inclined condition of Fig. 2.

The lower ends of the toggle devices 71, 72, are connected with body plate 30 of the main slide 13 at laterally spaced points of the latter, by suitable pivotal connections 78 which include bearing brackets 80 secured by screws 79 to bearing mounts 81 provided on the rear face of the body plate. The upper ends of the toggle devices 71 and 72 are connected with the frame structure 11 through adjusting screws 82. The upper ends of the toggle devices are pivotally connected with the lower ends of the adjusting screws 82 by pivotal connections 83.

The adjusting screws 82 have plain stem portions 82$^a$ which are axially slidable in lower bearing members 84 mounted in the hollow frame member 21. The upper ends of the screws 82 extend into clearance openings of upper bearing members 85 which are in alignment with the lower bearing members 84 and are also mounted in the hollow frame member 21. The lower and upper bearing members 84 and 85 are mounted in the frame member 21 by being welded thereto and have their adjacent ends separated by an intervening space.

The adjacent ends of the lower and upper bearing members 84 and 85 define spaced annular thrust shoulders 86 and 87 with which the ends of an adjusting nut 88 cooperate. The nuts 88 are disposed in the spaces between the lower and upper bearing members 84 and 85 and are rotatable on the threaded portions 89 of the adjusting screws 82. Washers 90 are disposed between the ends of the nut 88 and the shoulders 86, 87 for taking up looseness and for ease of replacement when wear occurs.

To provide for rotation of the adjusting nuts 88 on the adjusting screws 82, these nuts have worm gears 95 thereon disposed such that portions or sectors 95$^a$ of the gears project forwardly of the frame member 21 through openings 96 of the latter. Rotation of the nuts 88 is produced by a rotatable adjusting shaft 97 having worm members 98 thereon in meshing engagement with the gears 95. The adjusting shaft 97 is rotatable in bearings 99 which are mounted on the front face of the frame member 21 and is adapted to be actuated by a handwheel 100.

By actuation of the handwheel 100, the adjusting shaft 97 will drive the adjusting nuts 88 causing lifting or lowering of the two adjusting screws 82 simultaneously, depending upon the direction in which the handwheel is rotated. Since the nuts 88 are confined against axial shifting by the thrust shoulders 86 and 87, the adjusting screws 82 will be moved axially through the nuts to cause the desired adjustment of the toggle devices 71 and 72. Rotation of the adjusting screws 82 in the lower bearing member 84 is prevented by suitable keys 101.

The toggle devices 71 and 72 are swung or flexed between their contracted and expanded condition by connecting rods 104 which connect the pivotal connections 75 with eccentrics 106 which are fixed on a drive shaft 107. The drive shaft 107 is suitably mounted on the frame structure 11 and has main gears 108 secured thereto at the outer ends thereof. The main gears 108 of the shaft 107 are driven by pinion gears 109 mounted on the ends of an intermediate shaft 110. This intermediate shaft is also mounted on the frame structure 11 and has an intermediate gear 111 thereon. The intermediate shaft is driven from an electric motor 112 through a flywheel shaft 113 which is also mounted on the frame structure 11.

The flywheel shaft 113 has a flywheel 114 thereon and a drive pinion 115 which meshes with the intermediate gear 111. The driving motor 112 is connected with the flywheel shaft 113 through a motor pulley 116 and a flywheel pulley 117 and a belt 118 extending around these pulleys. The motor 112 is mounted on the frame structure 11 by a bracket plate 119 suitably attached to the upright 20.

The connection between the intermediate gear 111 and the intermediate shaft 110 is controlled by suitable clutch mechanism (not shown) of a conventional type for shearing machines of this kind and which is actuated or controlled by a treadle 120. The motor 112 drives the flywheel 114 and the intermediate gear 111 continuously, such that when the treadle 120 is depressed, the intermediate gear will be drivingly connected with the shaft 110 through the clutch mechanism to cause a work stroke of the slide 13. Gear covers 108$^a$ are preferably mounted on the uprights 19 and 20 in covering relation to the gears 108 and 109.

During the work stroke of the slide 13, the flywheel 114 will supply stored energy to the slide in addition to the energy being directly delivered by the motor 112. The stored energy of the flywheel 114 thereby becomes effective on the slide 13 through the toggle devices 71 and 72, such that an extremely powerful actuating force will be concentrated at the shearing point while such shearing point travels along the longitudinally tapered edge 46 of the movable shear blade 16 during the closing movement of the latter. The shearing force thus made available at the shearing point will be very effective and cause a smooth and rapid shearing action between the blades 15 and 16.

The work slide 13 is preferably counterbalanced by means of a pair of counterbalancing cylinder 121 having pistons 122 operable therein. Piston rods 123, projecting from the lower ends of the cylinders 121, are connected with the work slide 13 by means of yokes 124 mounted on the bracket arms 32 and to which the lower ends of the piston rods are pivotally connected. Cylinder covers 125, provided on the upper ends of the counterbalancing cylinders 121, carry yokes 126 which are pivotally mounted in supporting brackets 127 provided on the frame member 22.

The counterbalancing cylinders 121 are single-acting cylinders in which an elastic pressure fluid, such as compressed air, is continuously effective beneath the pistons 122 and exerts a lifting force on the latter. Such compressed air is supplied to the cylinders 121 from any available source, such as an air supply tank 128 which is mounted on the frame member 21 by the support hanger 129.

The shear 10 is also provided with a work hold-down means which is carried by the auxiliary slide 14 and cooperates with the work support 12 in clamping the work against the latter for the shearing operation. The hold-down means is here shown as comprising a row of cylinders 131 mounted on the lower edge of the auxiliary slide 14 and having plungers 132 projectable therefrom for engagement of the lower ends of the plungers with the work. Actuating fluid, such as pressure liquid, is supplied to the cylinders 131 through a supply pipe 133. The plungers 132 are automatically retractible in the cylinders 131, as by the action of suitable compression springs (not shown) embodied in such cylinders, when the pressure of the actuating fluid is relieved.

In performing the shearing operation, the workpiece is placed on the support 12 with the portion of the workpiece which is to be sheared off extending in overhanging relation to the stationary shear blade 15. The cylinders 131 are then supplied with actuating fluid to cause the plungers 132 to be projected into clamping engagement with the work. The treadle 120 is then actuated to cause the drive shaft 107 to operate the toggle devices 71 and 72 to thereby produce a downward shearing stroke of the work slide 13. By an upward return movement of the work slide to its initial position, the upper shearing blade 16 is returned to its open position in which it remains until the next shearing operation is started.

The sheared section of the workpiece falls into a sloping plate 134 and slides downwardly on this plate to drop therefrom into an accessible position from which it can be removed from the machine.

From time to time, the shear blades 15 and 16 need to be removed from the machine for sharpening or replacement. It is also desirable at times to check or adjust the alignment of the lower portion of the body plate 30 on which the movable shear blade 16 is mounted, so as to maintain the latter blade in a straight condition for proper cooperation with the stationary blade 15. The checking or adjustment of this alignment of the body plate 30 requires access to the clamping and adjusting screws 40 and 41, and the removal and replacement of the shear blades 15 and 16 requires access to the connecting screws 42 and 44.

The position of the hold-down cylinders 131 in front of the shear blade 16 would ordinarily interfere with free access to the various screws mentioned just above, but in accordance with one of the features of this invention, the auxiliary slide 14 provides for a retracting movement of the cylinders 131 of a sufficient extent to move the cylinders and the lower edge of the auxiliary slide to a lifted position affording free access to such screws. Such a lifted position 131ª of the cylinders 131 is represented in broken lines in Fig. 3.

The lifting and lowering of the auxiliary slide 14 is accomplished by an actuating shaft 136 extending across the front of the machine and adapted to be rotated by a handwheel 137. The shaft 136 is journalled in housing members 138 which are mounted on the front guide members 49 of the frame structure 11. Worm members 139 are rotatable in the housings 138 and engage worm gears 140 which are also contained in the housings 138 and are mounted on pinion shafts 141 for driving the latter.

Pinions 142 mounted on the pinion shafts 141 are in meshed engagement with the racks 64 of the auxiliary slide 14 and cause lifting or lowering of the slide, depending upon the direction in which the handwheel 137 is rotated. Thus, by means of this actuating mechanism for the auxiliary slide 14, this slide can be raised or lowered for locating the hold-down cylinders 131 in proper relation to the work support 12, or for lifting the auxiliary slide and the hold-down cylinders to an out-of-the-way position to afford free access to the connecting screws of the shear blades and to the adjusting screws controlling the alignment of the body plate 30 of the work slide 13.

When the auxiliary slide 14 has been moved to the desired lowered position in which it is shown in Figs. 1, 2 and 6, it can be locked in that position by means of locking screws 143 which have threaded engagement in, and extend through, the front guide members 49 as shown in Figs. 4 and 6. The locking screws 143 have locknuts 144 thereon and at their inner ends are provided with plain pin portions 145 which are engageable in holding recesses 146 formed in the edges of the auxiliary slide or in lug projections 147 of such edges.

Figure 7:
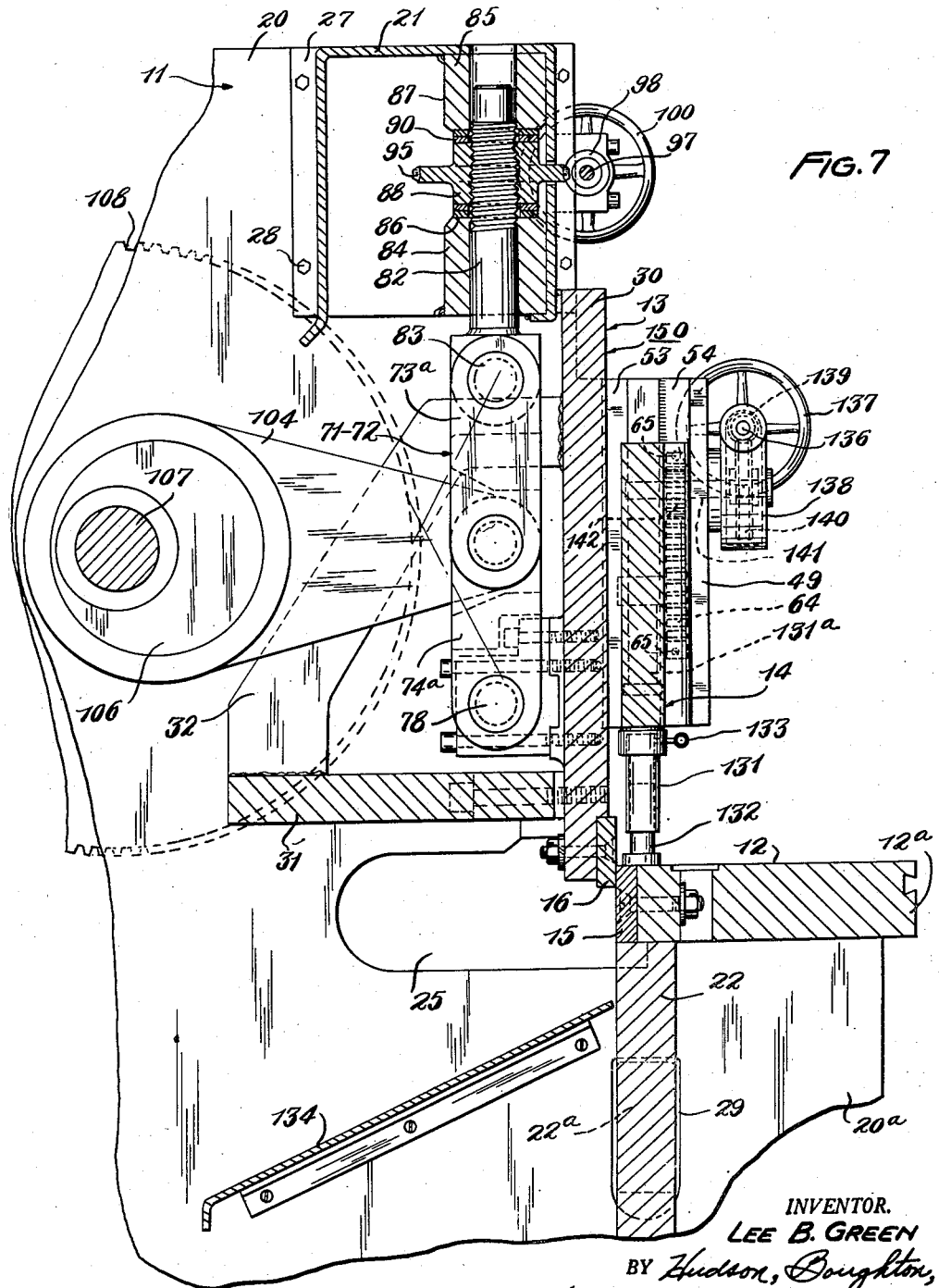
Fig. 7 is a partial vertical section similar to Fig. 3 but showing a modified form of shear.

Fig. 7 of the drawings shows a modified form of shear 150 which is generally similar to the above-described shear 10 and in which the same reference characters have been applied to the same corresponding parts. In the modified shear 150, however, the toggle devices 71 and 72 have toggle members 73ª and 74ª which are straight members rather than the curved members 73 and 74 of the shear 10. In the modified shear 150 the actuation of the toggle devices 71 and 72, to the straight line or expanded condition shown in Fig. 7 for causing the downward working stroke of the work slide 13, is produced by a pushing force applied to the toggle devices through the connecting rods 104 rather than a pulling force. The actuation of the toggle devices from their straight line or expanded condition of Fig. 7 to their collapsed or inclined condition for causing an upward movement of the work slide 13 is produced by a pulling force transmitted through the connecting rods 104.

During the application of the pushing force to the toggle devices 71 and 72 for causing the downward stroke of the work slide 13, a component of the actuating force exerts a forward and downward wedging action on the work slide 13, by which the work slide will be tightly pressed against the frame bearings, such that a desired operating clearance of a predetermined width can be maintained between the shear blades. This wedging force is also such as to urge the shear blade 16 toward a face-to-face engagement with the shear blade 16 during the shearing operation.

From the accompanying drawings and the foregoing detailed description, it will now be readily understood that this invention provides a shearing machine of a relatively simple and inexpensive construction, but which is rugged and durable for prolonged useful operation with minimum servicing attention thereto. It will also be seen that through the toggle type of actuating devices provided for the work slide, and the longitudinal taper of the movable shear blade, a very powerful shearing force can be applied to the work and can be concentrated at a shearing point which moves progressively along the movable shear blade during the shearing operation. It will now be seen further that in this improved shear, the work hold-down means is readily movable to an out-of-the-way position affording free access to the adjustable portions of the work slide and to the movable shear blade for adjusting or connecting operations needed to be performed thereon. Additionally, it will be seen that the shear embodies novel guide means for the work slide and for the auxiliary slide carrying the hold-down means, such that accurate positioning of the work slide is readily obtainable, and such that the actuating means for the auxiliary slide is effective on the latter through gearing housed in the guide means. Likewise, it will be seen that the adjusting means provided for the toggle devices which actuate the work slide enable the toggle devices to be readily adjusted simultaneously.

Although the shear construction of the present invention is illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In a shear of the character described, an upright frame having thereon a work support and an upright guideway above said work support, a slide comprising an upright body plate having end portions thereof operable in said guideway and a stiffening plate extending rearwardly from said body plate in an edgewise disposed substantially right angle relation thereto and secured to the latter adjacent the lower edge thereof, bearing means connected with said body plate on the rear side thereof and located adjacent to but above said stiffening plate, cooperating shear elements one of which is mounted on said support and the other of which is secured to said body plate on the front side thereof, upright toggle means extending along said body plate on the rear side thereof and having an upper end pivotally connected with said frame and a lower end pivotally connected with said body plate by said bearing means, said toggle means comprising a pair of toggle members and a knuckle joint pivotally connecting the adjacent ends of said toggle members, said toggle means being movable between a flexed condition thereof and a substantially aligned condition of said toggle members for actuating said slide in said guideway, and actuating means mounted on said frame rearwardly of said body plate and connected with the knuckle joint of said toggle means for imparting the flexing and aligning movements to the latter.

2. A shear as defined in claim 1 in which said body plate has a clearance opening therein and said knuckle joint is movable into and out of said opening during the operation of said toggle means.

3. In a shear of the character described, an upright frame having thereon a laterally elongated work support and an upright guideway extending above said work support, a laterally elongated slide comprising an upright body plate having end portions thereof operable in said guideway and a stiffening plate extending rearwardly from said body plate in an edgewise disposed substantially right angle relation thereto and secured to the latter adjacent the lower edge thereof, cooperating shear elements one of which is mounted on said support and the other of which is secured to said body plate on the front side thereof, laterally spaced bearings connected with said body plate on the rear side thereof and located adjacent to but above said stiffening plate, upright toggle devices extending along said body plate at laterally spaced points on the rear side thereof and having their lower ends pivotally connected with said body plate by said bearings, anchor means pivotally connecting the upper ends of said toggle devices with said frame, said toggle devices each comprising a pair of toggle links and a knuckle joint pivotally connecting the adjacent ends of said links, said toggle devices being movable between a flexed condition thereof and a substantially aligned condition of said links for causing actuation of said slide, a rotatable actuating shaft mounted on said frame rearwardly of said body plate, and connecting rods connecting said knuckle joints with said shaft at spaced points of the latter for imparting the flexing and aligning movements to said toggle devices.

4. In a shear of the character described, an upright frame having thereon a laterally elongated work support and an upright guideway extending above said work support, a laterally elongated slide comprising an upright body plate having end portions thereof operable in said guideway and a stiffening plate extending rearwardly from said body plate in an edgewise disposed substantially right angle relation thereto and secured to the latter adjacent the lower edge thereof, cooperating shear elements one of which is mounted on said support and the other of which is secured to said body plate on the front side thereof, laterally spaced bearings connected with said body plate on the rear side thereof and located adjacent to but above said stiffening plate, upright toggle devices extending along said body plate at laterally spaced points on the rear side thereof and having their lower ends pivotally connected with said body plate by said bearings, upright adjusting screws having the upper ends of said toggle devices pivotally connected therewith, said toggle devices each comprising a pair of toggle members and a knuckle joint pivotally connecting the adjacent ends of said toggle members, said toggle devices being movable between a flexed condition thereof and a substantially aligned condition of said toggle members for causing actuation of said slide, pairs of spaced-apart thrust surfaces on said frame, nut members disposed between the paired thrust surfaces and rotatable on said screws, actuating means mounted on said frame rearwardly of said body plate and connected with the knuckle joints of said toggle devices for imparting the flexing and aligning movements to the latter, a rotatable adjusting shaft extending laterally of said frame, and gear means connecting said shaft with said nut members for imparting simultaneous rotation to the latter.

References Cited in the file of this patent

UNITED STATES PATENTS

| | | |
|---|---|---|
| 484,203 | Horner | Oct. 11, 1892 |
| 680,656 | Gray | Aug. 13, 1901 |
| 1,250,858 | Grimm | Dec. 18, 1917 |
| 1,341,312 | Glines | May 25, 1920 |
| 1,881,185 | Hazelton | Oct. 4, 1932 |
| 2,191,826 | Bath | Feb. 27, 1940 |
| 2,208,966 | Eickman | July 23, 1940 |
| 2,336,351 | Flowers | Dec. 7, 1943 |
| 2,532,672 | Michael et al. | Dec. 5, 1950 |
| 2,548,712 | Firmin | Apr. 10, 1951 |
| 2,587,746 | May | Mar. 4, 1952 |
| 2,621,733 | Seybold | Dec. 16, 1952 |
| 2,633,195 | Rupp | Mar. 31, 1953 |
| 2,734,572 | Pater | Feb. 14, 1956 |

FOREIGN PATENTS

| | | |
|---|---|---|
| 629,453 | Great Britain | Sept. 20, 1949 |